(12) United States Patent
Kim (10) Patent No.: US 9,547,355 B2
(45) Date of Patent: Jan. 17, 2017

(54) VOLTAGE REGULATOR CONTROL FOR IMPROVED COMPUTING POWER EFFICIENCY

(71) Applicant: Wisconsin Alumni Research Foundation, Madison, WI (US)

(72) Inventor: Nam Sung Kim, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 226 days.

(21) Appl. No.: 14/461,988

(22) Filed: Aug. 18, 2014

(65) Prior Publication Data
US 2016/0048188 A1    Feb. 18, 2016

(51) Int. Cl.
*G06F 1/32*    (2006.01)

(52) U.S. Cl.
CPC ............. *G06F 1/3206* (2013.01); *G06F 1/324* (2013.01); *G06F 1/3296* (2013.01)

(58) Field of Classification Search
CPC ....... G06F 1/3206; G06F 1/3296; G06F 1/324
See application file for complete search history.

(56) References Cited

U.S. PATENT DOCUMENTS

| | | | | |
|---|---|---|---|---|
| 2005/0046400 A1* | 3/2005 | Rotem | ................. | G06F 1/3203 323/234 |
| 2007/0013350 A1* | 1/2007 | Tang | ................... | H02M 3/1584 323/237 |
| 2009/0172442 A1* | 7/2009 | Alexander | ................ | G06F 1/26 713/323 |
| 2009/0307509 A1* | 12/2009 | Jenne | .................... | G06F 1/3203 713/322 |
| 2011/0080151 A1* | 4/2011 | Rahardjo | ............ | H02M 3/1584 323/285 |
| 2011/0320838 A1 | 12/2011 | Jenne | | |
| 2014/0232368 A1* | 8/2014 | Dally | ................... | H02M 3/155 323/311 |

OTHER PUBLICATIONS

Sinkar et al.; Workload-Aware Voltage Regulator Optimization for Power Efficient Multi-Core Processors; Conference, Design, Automation & Test in Europe Conference & Exhibition (Date), 2012; 1134-1137; US.

* cited by examiner

*Primary Examiner* — Stefan Stoynov
(74) *Attorney, Agent, or Firm* — Boyle Fredrickson, S.C.

(57) ABSTRACT

A controller for voltage regulators providing power to computer processors may control the number of active phases of each voltage regulator according to a determined electrical current demand from the processor. By relying on electrical current demand rather than a P-state, the latter generally indicating a power conservation status, improved regulator efficiencies may be had, in particular responding to situations where low current demand occurs under heavy processor demand because of C-state variations.

12 Claims, 4 Drawing Sheets

VOLTAGE REGULATOR CONTROL FOR IMPROVED COMPUTING POWER EFFICIENCY

STATEMENT REGARDING FEDERALLY SPONSORED RESEARCH OR DEVELOPMENT

This invention was made with government support under HR0011-12-2-0019 awarded by the DOD/DARPA and 0953603 awarded by the National Science Foundation. The government has certain rights in the invention.

CROSS REFERENCE TO RELATED APPLICATION

Not Applicable

BACKGROUND OF THE INVENTION

The present invention relates generally to computer systems and in particular to a voltage regulator system for use with computer processors to provide improved power efficiency under different processing loads.

Managing the power consumption of computer systems is important for reducing energy costs, for example, in large computer installations, as well as prolonging battery life on portable devices.

Electrical power delivered to a computer processor normally passes through one or more voltage regulators that reduced the voltage of a power source (for example, from line voltage or battery voltage) to lower working voltages needed by the processor core (for example, 3.3, 1.2 volts, etc.). These voltage regulators can be a significant source of power loss, consuming as much as 22 percent of total power to the computer system in some circumstances. The problem of power loss in voltage regulation is increasing with increased power consumption associated with modern processors and with decreased operating voltages of processor cores, the latter of which tends to decrease voltage regulator efficiency.

A common voltage regulator for computer app occasions operates by switching received power on and off to control the "duty cycle" or average on-time of current flow at the output. The switched mode operation allows the transistors of the voltage regulator to dissipate less power in the voltage reduction process. The fluctuations in output current, caused by the switch mode operation are smoothed by a low pass filter at the output of the voltage regulator to provide an acceptable amount of output voltage ripple.

The power loss of a switched mode voltage regulator is the sum of a conduction loss through the regulator transistor when that transistor is conducting (a function of the current flow and the switch on-resistance) and a switching loss occurring during the transition by the transistor between on and off states (a function of switching frequency and current flow). It is known to reduce the switching loss of the voltage regulator by dividing the regulated current among multiple switching transistors connected in parallel and running each transistor at a lower switching frequency and with staggered switching phases. Each of the separate current paths through a different switch is often termed a "phase". Collectively, the transistors of the different phases provide switch transitions at the same rate as a single transistor thereby providing comparable ripple, but because each transistor switches a substantially lower portion of the current, switching losses are significantly reduced.

The power consumption of the computer processor supplied by the voltage regulators can also be reduced. One method of reducing the power consumed by the computer processor is to operate the processor in different "P-states" where each P-state supplies the processor with a different clock frequency and operating voltage. High-numbered P-states (e.g., P13) reduce power by decreasing the clock rate and hence the switching losses of the processor transistors and by reducing the processor operating voltage (possible because of the low clock rate) reducing leakage currents. Conversely, low-numbered P-states (e.g., P0) provide high clock frequencies and high operating voltages needed for demanding computation but use substantially more power. The P-state may be varied as a function of processor load so that power is reduced by reducing clock frequency in operating voltage when processor load is low.

As the processor P-state rises and lower power is consumed, the efficiency of the voltage regulator decreases. This decrease in voltage regulator efficiency can be mitigated by reducing the number of operating voltage regulator phases as power consumption decreases. US patent application 2011/0320838 describes a system in which the P-state is used to control the number of voltage regulator phases so that for high number P-states, a reduced number of voltage regulator phases are activated, consistent with the reduced current load of a processor in the high number-P-states, and for low number P-states, a higher number of voltage regulator phases are activated to provide the necessary current for computationally demanding tasks.

SUMMARY OF THE INVENTION

The present inventor has determined that the P-state provides a fundamentally misleading proxy for current consumption by the processor core. In particular when a processor is in a low-number P-state (during computationally demanding tasks that suggests a need for high power) actual power consumption by the processor can be low for a significant period of time resulting in substantial inefficiencies in the voltage regulation process. For this reason, the present invention provides for the control of regulator phase number according to an evaluation of processor current consumption rather than a P-state related to processor voltage and frequency. The second level of control may reflect the voltage applied to the processor for which P-state may serve as a proxy.

Specifically, the present invention provides a voltage regulator system for a computer processor including a voltage regulator receiving input power at an input and providing regulated output power to the computer processor, where the voltage regulator has multiple voltage regulator phases that may be independently switched between an active state regularly and periodically conducting current from the input to the output and an inactive state not conducting current from the input to the output. The system also includes a voltage regulator controller communicating with the voltage regulator to determine a current flow from the output of the regulator to the computer processor at a given time and controlling the phases of the voltage regulator in response to the determined current flow so that a first number of phases are in the active state when current flow is in a first range and a second number of phases, greater than the first number, are in the active state when the current flows in a second range are greater than the first range.

It is thus a feature of at least one embodiment of the invention to provide for voltage regulator control based on a determination of current to the processor, rather than, for example, P-state alone, which at best provides a mixed measure of voltage and frequency.

The voltage regulator controller may vary the number of phases in the active state as a function of the current flow among more than three values so that increasing numbers of phases are active with increased current flow.

It is thus a feature of at least one embodiment of the invention to provide a fine-grained adjustment in the number of phases up to individually controlling each phase.

The voltage regulator controller may control the phases of the voltage regulator to change the number of phases without a change in a P-state of the processor.

It is thus a feature of at least one embodiment of the invention to provide for the control of voltage regulators that reflects significant periods of low power consumption that can occur even during high power associated P-states.

The voltage regulator converter may further determine a value related to voltage output from the regulator to the computer processor and may further control the phases of the voltage regulator in response to the value related to voltage output so that a first number of phases are in the active state when the value related to voltage is in a first range, and a second number of phases, greater than the first number, are in the active state when the value related to voltage in a second range is greater than the first range.

It is thus a feature of at least one embodiment of the invention to provide a more precise adjustment of voltage regulator operation depending on the secondary influence of regulator voltage beyond the primary influence of regulator current.

The value related to voltage output may be a processor P-state.

It is thus a feature of at least one embodiment of the invention to provide a simple proxy for a voltage regulator voltage that is available with current processor hardware.

The voltage regulator controller may predict current flow from the output of the regulator at the given time anticipating actual current output from the regulator at the given time.

It is thus a feature of at least one embodiment of the invention to allow for more sophisticated control of voltage regulator efficiency than possible by monitoring power changes after the fact, for example, by direct measurement of output current and voltage.

The voltage regulator controller determines current flow at no less than 500 microsecond intervals.

It is thus a feature of at least one embodiment of the invention to provide a practical control algorithm that does not use substantial processor resources.

In one embodiment, the voltage regulator controller may determine an electrical current flow by identifying an operating voltage of the computer processor and an activity level of the components of the computer processor and assigning an assumed current demand for each active subsystem at the identified operating voltage and activity level and totaling the assigned current demands for each active subsystem.

It is thus a feature of at least one embodiment of the invention to provide a method of determining computer processor current load from existing data in the processor without the need for an actual current sensor.

The voltage regulator controller may alternatively or in addition determine an electrical current flow by using a power value obtained from an energy counter of the computer processor.

The operating voltage may be deduced from measured frequency of operation of the processor and its P-state and a predetermined relationship between measured frequency, P-state, and voltage.

It is thus a feature of at least one embodiment of the invention to provide a simple method of determining processor operating voltage without the need for an actual voltage sensor.

It is thus another feature of at least one embodiment of the invention to provide an improved voltage regulator system for next generation hardware providing direct rather than inferred current measurement.

These particular objects and advantages may apply to only some embodiments falling within the claims and thus do not define the scope of the invention.

DETAILED DESCRIPTION OF THE PREFERRED EMBODIMENT

Figure 1:
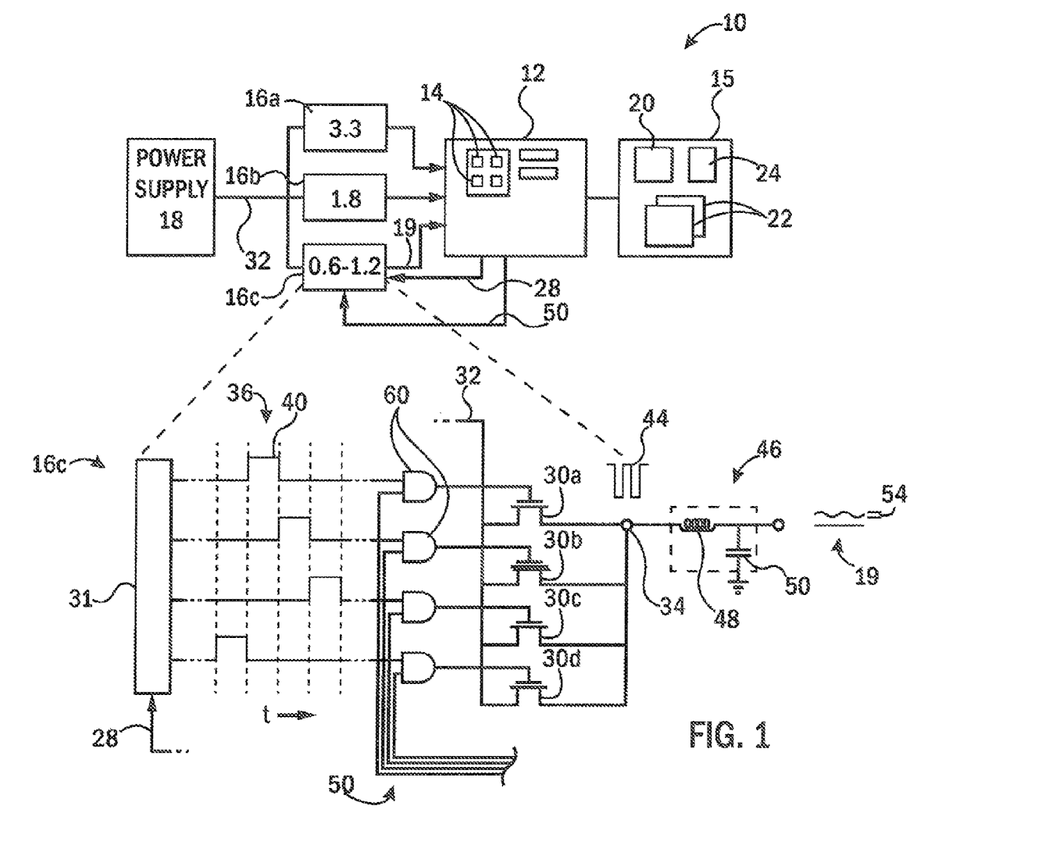
FIG. 1 is a simplified block diagram of a processor system providing a processor and associated electronic memory, a power supply, and multiple voltage regulators at least one of which may be controlled by the processor to adjust the power received by the processor, also showing an enlarged simplified schematic of a voltage regulator having multiple adjustable phases.

Referring now to FIG. 1, a processor system 10 may include a processor 12 providing one or more processor cores 14 communicating with an electronic memory 15. The processor 12 may be, for example, a processor supporting the x86 instruction set architecture. The processor 12 may also include one or more registers 26 exposing details of the processor operation as will be discussed below.

The electronic memory 15 may hold an operating system 20, such as Windows, OSX, Linux and the like, as well as various application programs and application data 22. The electronic memory 15 may also hold a voltage regulator control program 24 of the present invention. It will be understood generally that the voltage regulator control program 24 may alternatively be incorporated into the operating system 20, or may be distributed among firmware and hardware components incorporated fully or partially into the processor 12 as a matter of engineering choice.

The processor 12 may receive electrical power through one or more voltage regulators 16a-16c that in turn receive power from a power supply 18 as discussed below. Typically the power supply 18 will receive power directly from a battery (e.g., at twelve volts DC) or from a power line (approximately 110 to 120 volts AC) to provide a first level of voltage step down and/or regulation and rectification.

The various regulators 16 receiving power from the power supply 18 may further reduce the power output from the power supply 18 to provide, for example, current 19 at voltage outputs of 3.3 volts (e.g., from regulator 16*a*) and 1.8 volts (e.g., from regulator 16*b*), and a controllable output of 0.6-1.2 volts (e.g., from regulator 16*c*). This latter regulator 16*c* may receive a voltage control signal 28 from the processor 12 controlling its voltage output, as will be discussed further below, as part of known power management techniques.

The regulator 16*c* is generally representative of the other regulator 16 except for its ability to adjust its output voltage and may be multiphase regulators having multiple switch elements 30*a*-30*c* such as MOS transistors receiving electrical power 32 from the power supply 18 and switchably controlling current that passes from the power supply 18 to an output node 34 of the voltage regulator 16*c*. Each of the switch elements 30*a*-30*c* is controlled according to one of a set of switch signals 36 from a switch signal generator 31. Generally, each of the switch signals 36 provides a two-state pulse train having a high-state 40 that turns the respective switch 30 on and a low-state 42 which turns respective switch 30 off. By changing the duty cycle of the high-state 40 to the low-state 42, that is, the amount of time that the switch 30 is "on" or closed, the average current flow to the nodes 34 and/or the average voltage at the node 34 may be set to a desired value, for example, by feedback control.

The duty cycle of each of the switch signals 36 will normally be controlled in tandem by the switch signal generator 31 according to voltage control signal 28 received from the processor 12. The on-time or high-state 40 of each of the switch signals 36, however, will generally be offset from the others so that only one switch 30 is on at a given time to provide a more consistent delivery of electrical power and less output voltage variation.

Each of the switches 30*a*-30*d* provides the different "phase" and are connected in parallel so that the current provided through each switch 30 adds to provide a switched current signal 44 at the node 34 equal to the sum of the currents through each switch 30. A low pass filter 46, for example, comprising a series inductor 48 and shunting capacitor 51, may smooth the switched current signal 44 to provide a substantially DC current signal 19 having reduced ripple 54.

Voltage regulator 16*e*, in distinction from the other regulators 16, may also receive phase control signal 50 from the processor 12 in addition to the voltage control signal 28. The phase control signal 50 controls how many of the switches 30 or phases are in "active" state. The number of active phases may be varied from one to the full number of phases. Only four are shown in this example for clarity; however, typically as many as 19 phases may be available.

An active state for a phase is one in which a switch signal 36 communicates with a corresponding switch 30 so that the switch 30 is regularly and periodically switched between the on-state and off-state to provide an average current to the output node 34. An inactive state is where the switch signal 36 is blocked from communication with the switch 30 so that the switch 30 reverts to an off-state where no current passes through the switch 30 to the output node 34 for multiple cycles of the switch signal 36. Generally only in the active state can the on-time or duty cycle of the switch 30 be controlled.

The phase control signal 50, in one embodiment, may provide for separate lines that each control a corresponding gate 60 positioned between the switch signal generator 31 and each of the connected switches 30. Alternatively but not shown, the phase control signal 50 may be received correctly by the switch signal generator 31 to control the generation of the switch signals 36 directly to similar effect. The phase control signal 50 may be generated by the processor 12 so that the processor 12 may control the number of active phases according to the voltage regulator control program.

Figure 2:
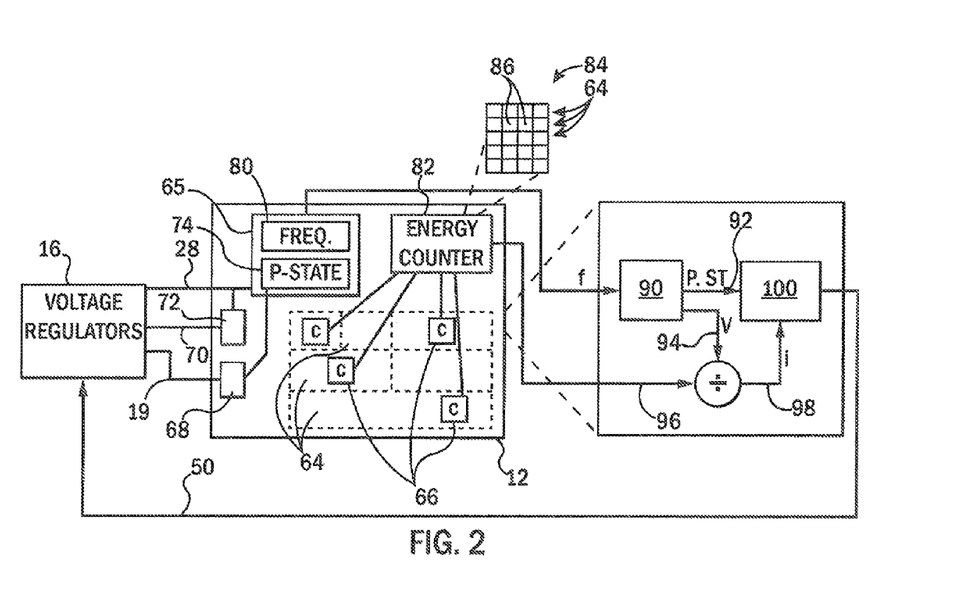
FIG. 2 is a detailed block diagram of the processor of FIG. 1 as controlled by a program executed by the processor or other hardware.

Referring now to FIG. 2, in one embodiment, the processor 12 may provide for a variety of processor components 64, for example, processor cores, caches, pipelines and the like, that may be each associated with a power management state (C-state) identified by a state register 66 associated with the component 64. The power management states determine the activity of the associated component 64 irrespective of its clock and voltage inputs. The power management states typically define a number of operating levels for the components ranging from an off-state (e.g., C3, where the component is fully turned off, consuming no power and providing no preserved state or execution) through a sleep state (e.g., C2, where the all clock functions are shut down but the architectural state is preserved), halt (e.g., C1, where the CPU dock only is stopped) and a full operating state(e.g., C0, where all functions are operating normally). For some non-processor components 64, the C-states are known as D-states and the particular C-numbers may vary between products. The C-states may be controlled by hardware of a type known in the art, for example, an Advanced Configuration and Power Interface (ACPI) 65 of a type known in the art.

Electrical power from the regulators 16 may be received at a power distribution circuit 68 which may include additional on-chip regulators and which distribute power to the components 64, turning power on and off according to the C-states and in some cases adjusting voltage levels as will be described. Control of power to the component 64 by the power distribution circuit 68 controls leakage of current power losses.

A clock signal 70 from an external clock generator (not shown) may be received at a clock processing circuit 72, for example, providing for a phase lock loop that allows adjustment of the frequency of a synchronizing clock received by the various components 64 with respect to the frequency of the clock signal 70 typically to one or more lower values.

The clock processing circuit 72 and the power distribution circuit 68 may receive commands from a P-state register 74 which may also provide voltage control signal 28 to the regulators 16 and in some cases to power distribution circuit 68 to also control the operating voltage received by the components 64.

As is generally understood in the art, various P-states may thereby be implemented where the components 64 of the processor 12 receive different clock speeds and operating voltages for power management. Unlike the C-states which are independently set for each of the component 64, typically the P-states apply to all components 64 equally or to groups of components having separate C-states (for example, processor cores). This is because of the complexities that occur if different components 64 are operating at different clock frequencies or voltages.

An example of typical P-states is provided in Table I below:

TABLE I

| P-state | Freq./Volt |
|---|---|
| Turbo | 3.9/1.52 |
|  | 3.8/1.42 |
|  | 3.7/1.32 |
|  | 3.6/1.22 |
| P0 | 3.5/1.20 |
| P1 | 3.4/1.17 |
| P2 | 3.3/1.15 |
| P3 | 3.2/1.12 |
| P4 | 3.1/1.10 |
| P5 | 3.0/1.07 |
| P6 | 2.9/1.05 |
| P7 | 2.8/1.02 |
| P8 | 2.7/1.00 |
| P9 | 2.6/0.97 |
| P10 | 2.5/0.95 |
| P11 | 2.4/0.92 |
| P12 | 2.3/0.90 |
| P13 | 2.2/0.87 |
| P14 | 2.1/0.85 |
| P15 | 2.0/0.82 |
| P16 | 1.9/0.80 |
| P17 | 1.8/0.77 |
| P18 | 1.7/0.75 |
| P19 | 1.6/0.72 |

The processor 12 may also provide, in one example, a frequency register 80 storing a frequency to which the clock processing circuit 72 is set under control of the P-state register 74.

In addition, the processor 12 may include a counter register 82 that provides an estimate of the energy being consumed by the processor 12. Such energy counter registers 82 are proprietary portions of some current processors but are generally implemented by means of the internal table 84 providing a logical row for each component 64 and indicating power consumption values 86 for that component 64 at various C-states and optionally at various voltages. Energy consumption by the processor 12 may be calculated for output from the energy counter register 82 by summing up the power consumption values 86 for each component 64 according to its current C-state held in registers 66.

The voltage regulator control program 24 in a first embodiment may read that value stored in the frequency register 80 and in the energy counter register 82. The value from the frequency register 80 may be applied to a first lookup table 90 having the data generally shown above with respect to Table I. Based on the frequency, a given P-state value 92 may be identified as well as an operating voltage value 94. It will be appreciated that in some architectures direct measurement of the P-state or the voltage value 94 may be obtained directly.

The voltage regulator controller program 24 may also read the energy counter register 82 to obtain a power consumption value 96. This power consumption value 96 may be divided by the voltage value 94 from the first lookup table 90 to provide a determined electrical current value 98 representing the current load presented by the processor 12 at a given time.

The P-state value 92 (deduced from the lookup table 90) and determined electrical current value 98 may be applied to a second lookup table 100 to provide phase control signal 50 used to control the number of phases of the regulator 16 that will be active.

Figure 3:
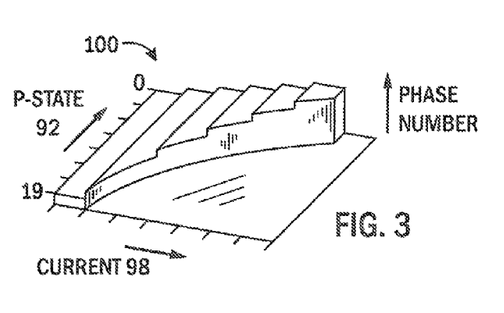
FIG. 3 is a perspective representation of lookup table values for mapping processor P-state values and processor current consumption to an optimal number of voltage regulator phases.
Figure 4:
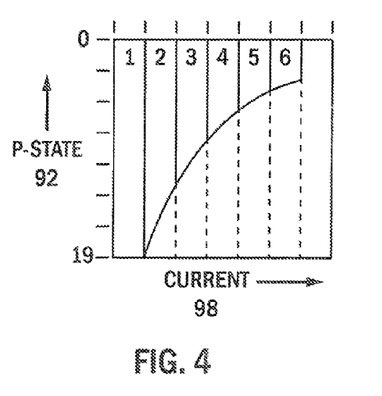
FIG. 4 is a plan view of the lookup table of FIG. 3 better showing the dependence of voltage regulator phase number on both current and to a lesser extent on P-state.

Referring now to FIGS. 3 and 4, the present inventors have determined that the optimal number of voltage regulator phases $n_{opt}$ for the phase control signal 50 is strongly dependent on the electrical current value 98 consumed by the processor 12. Accordingly, in some embodiments, only the electrical current value 98 may be required to determine the optimal number of voltage regulator phases $n_{opt}$. The present inventor has also determined, however, that the optimal number of voltage regulator phases $n_{opt}$ is weakly dependent on the voltage at which the voltage regulators 16 are working which may be expressed as a proxy by the P-state values per Table I above. Thus it can be seen that the optimal number $n_{opt}$ markedly as additional electrical current value 98 is required (as is best seen in FIG. 3) and to a lesser extent as lower P-state values are used for the processor corresponding to higher operating voltages (as best seen in FIG. 4). The data shown in FIGS. 3 and 4 may be compressed in the lookup table 100 to a compact form, for example, structured per the following Table II:

TABLE II

| P-state | $n_{opt} = 1$ | $n_{opt} = 2$ | $n_{opt} = 3$ | $n_{opt} = 4$ | $n_{opt} = 5$ | $n_{opt} = 6$ |
|---|---|---|---|---|---|---|
| 0-3 | 11 | 23 | 39 | 53 | 61 | 64 |
| 4-7 | 12 | 24 | 40 | 53 |  |  |
| 8-11 | 13 | 25 | 41 | 43 |  |  |
| 12-16 | 14 | 27 |  |  |  |  |

During the operation of the processor 12, the program 24 examines the table row corresponding to the known P-state and identifies the column having an electrical current value no greater than the present electrical current value 98. That column then identifies the value of $n_{opt}$ which forms the basis for the phase control signal 50.

Figure 5:
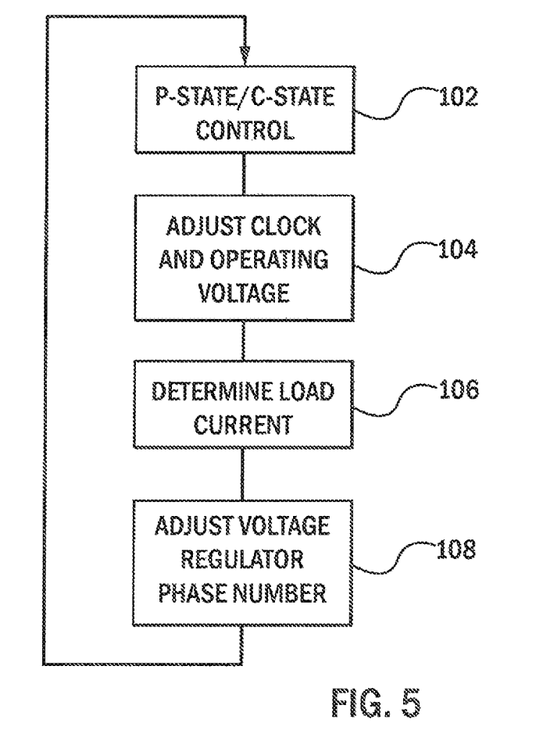
FIG. 5 is a flowchart showing the primary process steps implemented by the present invention.

Referring to FIGS. 2 and 5, the invention may work in tandem with the ACPI circuitry 65 of the processor 12 which may determine, as indicated by process block 102, the current P-state and C-states of the various components 64 and then, as indicated by process block 104, adjust the clock frequency and operating voltage using the regulator 16 and clock-processing circuit 72 described above.

At process block 106, a load current drawn from the regulators 16 is predicted, for example, as discussed with respect to FIG. 2. Optionally, one of the P-state or voltage output from the regulator 16 may also be determined.

At process block 108, the determined present electrical current value 98 and voltage or P-state may be applied to a lookup table to produce the value of $n_{opt}$ transmitted in the phase control signal 50 controlling the optimal number of regulator phases.

Figure 6:
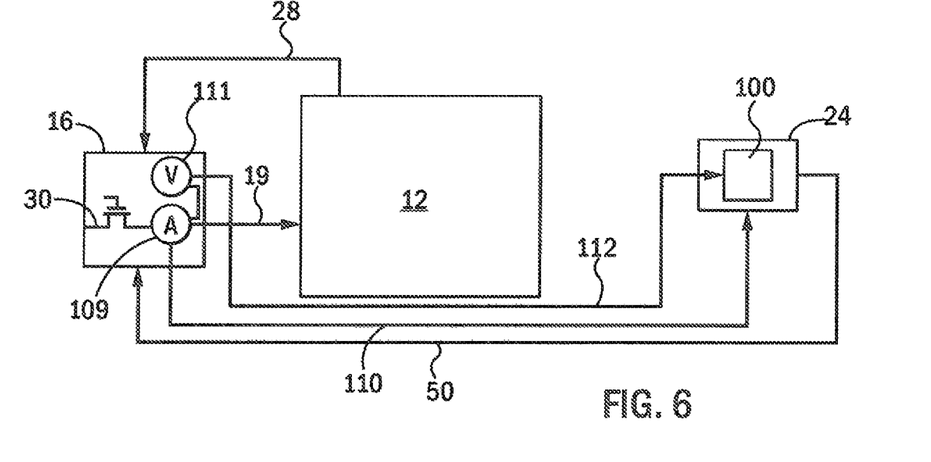
FIG. 6 is a figure similar to that of FIG. 2 showing an alternative architecture for measuring regulator output current to the processor.

Referring now to FIG. 6, it is contemplated that future implementations of voltage regulators 16 may provide direct measurements of load current, for example, by means of a current sensor 109, and/or load voltage by means of voltage sensor 111 incorporated into the regulator 16 or in the path between the regulator 16 and processor 12. Such a current sensor 109 may use any well-known sensing techniques thus measuring a voltage drop across a low resistance placed in series with output current 33 from voltage regulator 16 and providing an analog-to-digital converter fir exposing these values to the program 24. Generally current in a single phase of the voltage regulator 16 may be measured and extrapolated to the number of currently operating phases. The resistance may be a normal conductance resistance of one of the switches 30.

In this case, the directly measured current value 110 and voltage value 112 are provided directly to the voltage regulator control program 24 to be applied to the lookup table 100 as discussed above.

Figure 7:
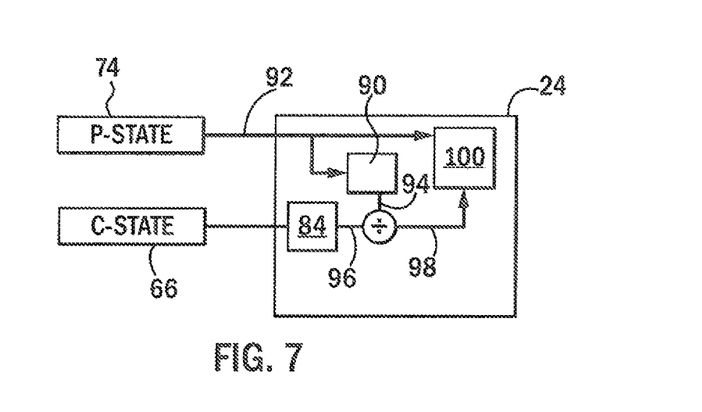
FIG. 7 is a block diagram showing deduction of processor current consumption using P-state and C-state data from the processor.

Referring now to FIG. 7, the invention contemplates that a number of alternative techniques may be used to deduce the desired current and optional voltage values for determining $n_{opt}$. In one additional example, it will be understood that knowledge of the P-state value from P-state register 74 and C-state values for register 66, when exposed by the manufacturer of the processor 12 or the operating system 20, may be used in the present invention with the P-state value used to determine a voltage value 94 using the first lookup table 90 and the C-state value used to determine a power consumption value 96 by reproducing the lookup table 84 described above with respect to FIG. 2 in the program 24. The derived value of voltage may then be used with the power consumption value 96 to produce the electrical current value 98. This value may be applied to the lookup table 100 and, as before, the P-state or the voltage value 94 may be applied directly to the lookup table 100. It will be generally understood that the lookup table 100 may be cast in terms of current and voltage rather than current and P-state when voltage is readily determined directly.

Alternatively, it will be appreciated that the lookup table 100 may be recharacterized in terms of P-state and C-state to the extent that each of these quantities capture values functionally related to the current and voltage at which the processor 12 is operating. This recharacterization simply applies the functional conversion between P-state and voltage and between C-state and current to the table values. The determination of current and voltage, therefore, should be considered to embrace the determination of any quantity that is functionally related to current and voltage.

It should be understood that, to the extent that the future P-state and C-state of the component 64 may be predicted and in fact is generally known before that state is changed, the present invention may anticipate changes in current load and thus be superior to a technique that actually measures current changes after they occur. Early knowledge of changes in load current allow more sophisticated adjustment of the voltage regulator 16 to increase or decrease the number of phases depending on the direction of transition to further improve efficiency. In addition, the present invention allows a historical record of power demand to be collected and used, for example, to predict changes in load current. In addition this historical record may be used to reduce the sampling rate of the program 24 by identifying power consumption patterns (for example, periods of constant power usage) eliminating the need for more frequent measurement. This, in turn, allows the program 24 to be executed with less processor overhead.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A voltage regulator system for a computer processor comprising:
   a voltage regulator receiving input power at an input and providing regulated output power to the computer processor, the voltage regulator having multiple voltage regulator phases that may be independently switched between an active state regularly and periodically conducting current from the input to the output and an inactive state not conducting current from the input to the output; and
   a voltage regulator controller communicating with the voltage regulator to determine an electrical current flow from the output of the regulator to the computer processor at a given time and controlling the phases of the voltage regulator in response to the determined electrical current flow so that a first number of phases are in the active state when electrical current flow is in a first range and a second number of phases, greater than the first number, are in the active state when the determined electrical current flows are in a second range greater than the first range;
   wherein the voltage regulator controller determines an electrical current flow by identifying an operating voltage of the computer processor and using a power value obtained from an energy counter of the computer processor divided by the operating voltage.

2. The voltage regulator system of claim 1 wherein the voltage regulator controller further determines a value related to a voltage output from the regulator to the computer processor and further controls the phases of the voltage regulator in response to the value related to voltage so that a first number of phases are in the active state when the value related to voltage is in a first range and a second number of phases, greater than the first number, are in the active state when the value related to voltage in a second range is greater than the first range.

3. The voltage regulator system of claim 2 wherein the value related to voltage is a processor P-state.

4. The voltage regulator system of claim 2 further including stored data describing a predetermined relationship between measured frequency, P-state, and voltage, and wherein the value related to voltage is a voltage deduced from measured frequency of operation of the processor and its P-state applied to the stored data.

5. The voltage regulator system of claim 1 wherein the voltage regulator controller determines an electrical current flow by identifying an operating voltage of the computer processor and an activity level of multiple components of the computer processor and assigning an assumed current demand for each active component of the computer processor at the identified operating voltage and activity level and totaling the assigned current demands for each active component.

6. The voltage regulator system of claim 1 wherein the voltage regulator controller varies the number of phases in the active state as a function of the electrical current flow among more than three different ranges of numbers of phases so that increasing numbers of phases are active with increased electrical current flow.

7. The voltage regulator system of claim 6 wherein the voltage regulator controller includes a stored function providing at least eight values denoting numbers of phases as a function of a current output from the voltage regulator and wherein the voltage regulator controller applies the determined electrical current flow to the stored function.

8. The voltage regulator system of claim 1 wherein the voltage regulator controller predicts electrical current flow from the output of the regulator at the given time anticipating actual current output from the regulator at the given time.

9. The voltage regulator system of claim 1 wherein each voltage regulator phase provides multiple parallel connected switching elements each controlled by a duty cycle signal whose duty cycle may be controlled to control an output voltage of that phase and wherein the phase is in the inactive state when the switching element is held open without response to the duty cycle signal.

10. The voltage regulator system of claim 1 further including the computer processor providing outputting a value indicating a frequency of operation and a value indicating energy consumption of the computer processor.

11. A voltage regulator system for a computer processor comprising:
a voltage regulator receiving input power at an input and providing regulated output power to the computer processor, the voltage regulator having multiple voltage regulator phases that may be independently switched between an active state regularly and periodically conducting current from the input to the output and an inactive state not conducting current from the input to the output; and
a voltage regulator controller communicating with the voltage regulator to determine an electrical current flow from the output of the regulator to the computer processor at a given time and controlling the phases of the voltage regulator in response to the determined electrical current flow so that a first number of phases are in the active state when electrical current flow is in a first range and a second number of phases, greater than the first number, are in the active state when the determined electrical current flows are in a second range greater than the first range;
wherein the voltage regulator controller controls the phases of the voltage regulator to change the number of phases without a change in a P-state of the processor and with a change in current flow between predetermined current states, and
wherein the voltage regulator controller further controls the phases of the voltage regulator to change the number of phases without a change in current flow between the predetermined current states and with a change in the P-state of the processor.

12. A voltage regulator system for a computer processor comprising:
a voltage regulator receiving input power at an input and providing regulated output power to the computer processor, the voltage regulator having multiple voltage regulator phases that may be independently switched between an active state regularly and periodically conducting current from the input to the output and an inactive state not conducting current from the input to the output; and
a voltage regulator controller communicating with the regulator to determine an electrical current flow from the output of the regulator to the computer processor at a given time and controlling the phases of the voltage regulator in response to the determined electrical current flow so that a first number of phases are in the active state when electrical current flow is in a first range and a second number of phases, greater than the first number, are in the active state when the determined electrical current flows are in a second range greater than the first range;
wherein the voltage regulator controller determines electrical current flow at no less than 500 microsecond intervals.

* * * * *